US009046655B2

(12) United States Patent
Goto et al.

(10) Patent No.: US 9,046,655 B2
(45) Date of Patent: Jun. 2, 2015

(54) METHOD OF MANUFACTURING POLARIZING PLATE

(71) Applicant: NITTO DENKO CORPORATION, Ibaraki-shi, Osaka (JP)

(72) Inventors: Shusaku Goto, Ibaraki (JP); Yuuki Nakano, Ibaraki (JP); Kentaro Ikeshima, Ibaraki (JP); Nobuyuki Haida, Ibaraki (JP); Minoru Miyatake, Ibaraki (JP); Osamu Kaneko, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/056,178

(22) Filed: Oct. 17, 2013

(65) Prior Publication Data

US 2014/0139919 A1    May 22, 2014

(30) Foreign Application Priority Data

Nov. 16, 2012  (JP) .................................. 2012-251784
Jul. 8, 2013   (JP) .................................. 2013-142375

(51) Int. Cl.
*G02B 5/30*    (2006.01)
*B29D 11/00*   (2006.01)

(52) U.S. Cl.
CPC .......... *G02B 5/305* (2013.01); *B29D 11/00644* (2013.01); *G02B 5/30* (2013.01)

(58) Field of Classification Search
CPC ...... G02B 5/30; G02B 5/3008; G02B 5/3016; G02B 5/3025; G02B 5/3033; G02B 5/3041; G02B 5/305; G02B 5/3058; G02B 5/3066; B32B 7/06; B32B 27/00

USPC .............. 359/487.01, 487.02, 483.01, 489.01
See application file for complete search history.

(56) References Cited

U.S. PATENT DOCUMENTS

| | | | |
|---|---|---|---|
| 2006/0225827 A1* | 10/2006 | Lei et al. .......................... | 156/64 |
| 2006/0246232 A1* | 11/2006 | Kubo et al. .................. | 428/1.31 |
| 2006/0292314 A1* | 12/2006 | Yamada et al. .............. | 428/1.31 |
| 2009/0021677 A1* | 1/2009 | Nakagawa et al. ........... | 349/117 |
| 2012/0148781 A1* | 6/2012 | Yamamoto et al. .......... | 428/41.8 |

FOREIGN PATENT DOCUMENTS

JP          2000-338329 A        12/2000

* cited by examiner

*Primary Examiner* — Suchin Parihar
*Assistant Examiner* — William R Alexander
(74) *Attorney, Agent, or Firm* — Westerman, Hattori, Daniels & Adrian, LLP

(57) ABSTRACT

A method of manufacturing a polarizing plate according to an embodiment of the present invention includes: stretching and dyeing a laminate having a resin substrate and a polyvinyl alcohol-based resin layer formed on at least one side of the resin substrate to produce a polarizing film on the resin substrate; laminating an optically functional film on the laminate on a polarizing film side to produce an optically functional film laminate; and peeling the resin substrate from the optically functional film laminate. The peeling is performed so that an angle α formed between a surface of the optically functional film laminate immediately before the peeling and a peeling direction of the resin substrate is smaller than an angle β formed between the surface of the optically functional film laminate immediately before the peeling and a peeling direction of the polarizing film.

22 Claims, 5 Drawing Sheets

US 9,046,655 B2

METHOD OF MANUFACTURING POLARIZING PLATE

This application claims priority under 35 U.S.C. Section 119 to Japanese Patent Application Nos. 2012-251784 and 2013-142375 each filed on Nov. 16, 2012, and Jul. 8, 2013, which are herein incorporated by reference.

BACKGROUND OF THE INVENTION

1. Field of the Invention

The present invention relates to a method of manufacturing a polarizing plate.

2. Description of the Related Art

Polarizing films are placed on both sides of a liquid crystal cell of a liquid crystal display apparatus as a typical image display apparatus, the placement being attributable to an image-forming mode of the apparatus. For example, the following method has been proposed as a method of manufacturing the polarizing film (for example, Japanese Patent Application Laid-open No. 2000-338329). A laminate having a resin substrate and a polyvinyl alcohol (PVA)-based resin layer is stretched, and is then subjected to a dyeing treatment so that the polarizing film may be formed on the resin substrate. According to such method, a polarizing film having a small thickness is formed. Accordingly, the method has been attracting attention because of its potential to contribute to thinning of an image display apparatus in recent years.

By the way, the polarizing film is typically laminated on another optically functional film (e.g., a protective film) and is used as a polarizing plate. However, the polarizing plate using the polarizing film produced by using the resin substrate involves the following problem. A wrinkle, foreign matter, or the like is liable to occur, and hence the polarizing plate is poor in external appearance.

SUMMARY OF THE INVENTION

According to an embodiment of the present invention, there is provided a method of manufacturing a polarizing plate excellent in external appearance.

A method of manufacturing a polarizing plate according to an embodiment of the present invention includes: stretching and dyeing a laminate having a resin substrate and a polyvinyl alcohol-based resin layer formed on one side of the resin substrate to produce a polarizing film on the resin substrate; laminating an optically functional film on the laminate on a polarizing film side to produce an optically functional film laminate; and peeling the resin substrate from the optically functional film laminate. The peeling is performed so that an angle α formed between a surface of the optically functional film laminate immediately before the peeling and a peeling direction of the resin substrate is smaller than an angle β formed between the surface of the optically functional film laminate immediately before the peeling and a peeling direction of the polarizing film.

In one embodiment of the present invention, a difference between the angle α and the angle β is 60° or more. In one embodiment of the present invention, the difference between the angle α and the angle β is 90° to 180°.

In one embodiment of the present invention, a tension needed for the peeling is 3.0 N/15 mm or less.

In one embodiment of the present invention, the resin substrate has a modulus of elasticity at a time of the peeling of 2 GPa to 3 GPa.

In one embodiment of the present invention, the resin substrate has a radius of curvature at a time of the peeling of 1 mm to 10 mm.

In one embodiment of the present invention, in the peeling, a peeling roll is arranged on the optically functional film laminate on an optically functional film side, and the peeling is performed with an aid of the peeling roll. In one embodiment of the present invention, the peeling roll has a diameter of 10 mm to 30 mm.

In one embodiment of the present invention, in the peeling, a peeling bar is arranged on the optically functional film laminate on an optically functional film side, and the peeling is performed with an aid of the peeling bar. In one embodiment of the present invention, the peeling bar has a diameter of a tip portion of 5 mm to 30 mm.

In one embodiment of the present invention, a surface of the optically functional film laminate on the optically functional film side has a surface protective film attached thereto.

According to another aspect of the present invention, a polarizing plate is provided. The polarizing plate is obtained by the manufacturing method as described above.

According to an embodiment of the present invention, an optically functional film is laminated on a polarizing film formed on a resin substrate to produce an optically functional film laminate, and upon peeling of the resin substrate from the optically functional film laminate, an angle α formed between the surface of the optically functional film laminate immediately before the peeling and the peeling direction of the resin substrate is set to be smaller than an angle β formed between the surface of the optically functional film laminate immediately before the peeling and the peeling direction of the polarizing film, whereby the resin substrate can be satisfactorily peeled while the occurrence of a wrinkle, foreign matter (such as a substrate residue), or the like is suppressed. As a result, a polarizing plate extremely excellent in external appearance can be obtained.

DETAILED DESCRIPTION OF THE PREFERRED EMBODIMENTS

Hereinafter, embodiments of the present invention are described. However, the present invention is not limited to these embodiments.

A method of manufacturing a polarizing plate according to an embodiment of the present invention includes: stretching and dyeing a laminate having a resin substrate and a polyvinyl alcohol-based resin layer formed on one side of the resin substrate to produce a polarizing film on the resin substrate; laminating an optically functional film on a polarizing film side of the laminate to produce an optically functional film laminate; and peeling the resin substrate from the optically functional film laminate. Hereinafter, the respective steps are described.

A. Step of Producing Polarizing Film

A-1. Laminate

Figure 1:
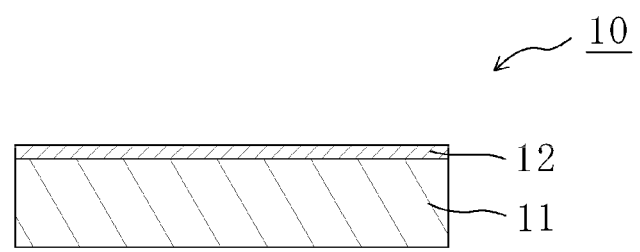
FIG. 1 is a partial sectional view of a laminate according to an embodiment of the present invention.

FIG. 1 is a partial sectional view of a laminate according to an embodiment of the present invention. A laminate 10 has a resin substrate 11 and a polyvinyl alcohol-based resin layer 12. The laminate 10 is produced by forming the polyvinyl alcohol-based resin layer 12 on the resin substrate 11 having a long shape. Any appropriate method may be adopted as a method of forming the polyvinyl alcohol-based resin layer 12. The polyvinyl alcohol-based resin (hereinafter referred to as "PVA-based resin") layer 12 is preferably formed by applying an application liquid containing a PVA-based resin onto the resin substrate 11 and drying the liquid.

As a formation material for the resin substrate, any appropriate thermoplastic resin may be adopted. Examples of the thermoplastic resin include: an ester-based resin such as a polyethylene terephthalate-based resin; a cycloolefin-based resin such as a norbornene-based resin; an olefin-based resin such as polypropylene; a polyamide-based resin; a polycarbonate-based resin; and a copolymer resin thereof. Of those, a norbornene-based resin and an amorphous polyethylene terephthalate-based resin are preferred.

In one embodiment, an amorphous (uncrystallized) polyethylene terephthalate-based resin is preferably used. In particular, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid component and a copolymer further containing cyclohexane dimethanol as a glycol component.

When an underwater stretching mode is adopted in a stretching treatment to be described later, the resin substrate can absorb water and the water acts as like a plasticizer so that the substrate can plasticize. As a result, a stretching stress can be significantly reduced. Accordingly, the stretching can be performed at a high ratio and the stretchability of the resin substrate can be more excellent than that at the time of in-air stretching. As a result, a polarizing film having excellent optical characteristics can be produced. In one embodiment, the percentage of water absorption of the resin substrate is preferably 0.2% or more, more preferably 0.3% or more. Meanwhile, the percentage of water absorption of the resin substrate is preferably 3.0% or less, more preferably 1.0% or less. The use of such resin substrate can prevent, for example, the following inconvenience: the dimensional stability of the resin substrate remarkably reduces at the time of the production and hence the external appearance of the polarizing film to be obtained deteriorates. In addition, the use of such resin substrate can prevent the rupture of the substrate at the time of the underwater stretching and the peeling of the PVA-based resin layer from the resin substrate. It should be noted that the percentage of water absorption of the resin substrate can be adjusted by, for example, introducing a modification group into the constituent material. The percentage of water absorption is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, the glass transition temperature is more preferably 120° C. or less in consideration of the plasticization of the resin substrate by water and favorable performance of the underwater stretching. In one embodiment, the glass transition temperature of the resin substrate is preferably 60° C. or more. The use of such resin substrate prevents an inconvenience such as the deformation of the resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.). In another embodiment, a glass transition temperature of less than 60° C. is permitted as long as the resin substrate does not deform during the application and drying of the application liquid containing the PVA-based resin. It should be noted that the glass transition temperature of the resin substrate can be adjusted by, for example, introducing a modification group into the formation material or heating the substrate constituted of a crystallization material. The glass transition temperature (Tg) is a value determined in conformity with JIS K 7121.

The thickness of the resin substrate before the stretching is preferably 20 µm to 300 µm, more preferably 50 µm to 200 µm. When the thickness is less than 20 µm, it may be difficult to form the PVA-based resin layer. When the thickness exceeds 300 µm, in, for example, underwater stretching, it may take a long time for the resin substrate to absorb water, and an excessively large load may be needed in the stretching.

Any appropriate resin may be adopted as the PVA-based resin for forming the PVA-based resin layer. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin may be appropriately selected depending on purposes. The average polymerization degree is typically 1,000 to 10,000, preferably 1,200 to 5,000, more preferably 1,500 to 4,500. It should be noted that the average polymerization degree can be determined in conformity with JIS K 6726-1994.

The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained. In addition, examples of the additive include an easy-adhesion component. The use of the easy-adhesion component can improve adhesiveness between the resin substrate and the PVA-based resin layer. As a result, an inconvenience such as peeling of the PVA-based resin layer from the substrate is suppressed, and dyeing and underwater stretching to be described later can be satisfactorily performed.

Examples of the easy-adhesion component include a modified PVA such as acetoacetyl modified PVA. A polymer having at least a repeating unit represented by the below-indicated general formula (I) is preferably used as the acetoacetyl modified PVA.

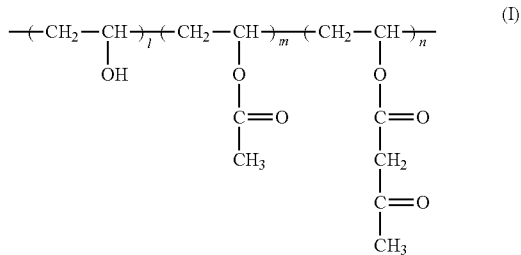

In the formula (I), the ratio of "n" to "l+m+n" (modification degree) is preferably 1% to 10%.

The saponification degree of the acetoacetyl modified PVA is preferably 97 mol % or more. In addition, the pH of a 4-wt % aqueous solution of the acetoacetyl modified PVA is preferably 3.5 to 5.5.

The modified PVA is added so that the amount of the modified PVA is preferably 3 wt % or more, more preferably 5 wt % or more with respect to the total weight of the PVA-based resins in the application liquid. On the other hand, the amount of the modified PVA added is preferably 30 wt % or less.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The thickness of the PVA-based resin layer before the stretching is preferably 3 μm to 40 μm, more preferably 5 μm to 20 μm.

The resin substrate may be subjected to a surface treatment (such as a corona treatment) before the formation of the PVA-based resin layer. Alternatively, an easy-adhesion layer may be formed on the resin substrate. Of those, the formation of an easy-adhesion layer (a coating treatment) is preferably performed. For example, an acrylic resin or a polyvinyl alcohol-based resin is used as a material for forming the easy-adhesion layer. Of those, a polyvinyl alcohol-based resin is particularly preferred. Examples of the polyvinyl alcohol-based resin include a polyvinyl alcohol resin and a modified product thereof. Examples of the modified product of the polyvinyl alcohol resin include the acetoacetyl modified PVA. It should be noted that the thickness of the easy-adhesion layer is preferably about 0.05 μm to 1 μm. Such treatment can improve adhesiveness between the resin substrate and the PVA-based resin layer. As a result, for example, an inconvenience such as peeling of the PVA-based resin layer from the substrate is suppressed, and dyeing and underwater stretching to be described later can be satisfactorily performed.

A-2. Stretching of Laminate

Any appropriate method may be adopted as a method of stretching the laminate. Specifically, fixed-end stretching may be adopted or free-end stretching (such as a method involving passing the laminate through rolls having different peripheral speeds to uniaxially stretch the laminate) may be adopted. Of those, free-end stretching is preferred.

The stretching direction of the laminate may be appropriately set. In one embodiment, the laminate having a long shape is stretched in its lengthwise direction. In this case, there may be typically adopted a method involving passing the laminate between rolls having different peripheral speeds to stretch the laminate. In another embodiment, the laminate having a long shape is stretched in its widthwise direction. In this case, there may be typically adopted a method involving stretching the laminate using a tenter stretching apparatus.

A stretching mode is not particularly limited and may be an in-air stretching mode or an underwater stretching mode. Of those, an underwater stretching mode is preferred. According to the underwater stretching mode, the stretching can be performed at a temperature lower than the glass transition temperature (typically about 80° C.) of each of the resin substrate and the PVA-based resin layer, and hence the PVA-based resin layer can be stretched at a high ratio while its crystallization is suppressed. As a result, a polarizing film having excellent optical characteristics can be produced.

The stretching of the laminate may be performed in one stage, or may be performed in a plurality of stages. When the stretching is performed in a plurality of stages, for example, the free-end stretching and the fix-end stretching may be performed in combination, or the underwater stretching mode and the in-air stretching mode may be performed in combination. When the stretching is performed in a plurality of stages, the stretching ratio (maximum stretching ratio) of the laminate to be described later is the product of stretching ratios in the respective stages.

The stretching temperature of the laminate may be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the resin substrate is preferably 60° C. or more in relation to the formation of the PVA-based resin layer. In this case, when the stretching temperature falls short of 40° C., there is a possibility that the stretching cannot be satisfactorily performed even in consideration of the plasticization of the resin substrate by water. On the other hand, as the temperature of the stretching bath increases, the solubility of the PVA-based resin layer is raised and hence excellent optical characteristics may not be obtained. The laminate is preferably immersed in the stretching bath for a time of 15 seconds to 5 minutes.

When the underwater stretching mode is adopted, the laminate is preferably stretched while being immersed in an aqueous solution of boric acid (in-boric-acid-solution stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent may also be used.

When the PVA-based resin layer has been caused to adsorb a dichromatic substance (typically iodine) in advance by dyeing to be described later, the stretching bath (aqueous solution of boric acid) is preferably compounded with an iodide. Compounding the bath with the iodide can suppress the elution of iodine that the PVA-based resin layer has been caused to adsorb. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The concentration of the iodide is preferably 0.05 part by weight to 15 parts by weight, more preferably 0.5 part by weight to 8 parts by weight with respect to 100 parts by weight of water.

The stretching ratio (maximum stretching ratio) of the laminate is preferably 5.0 times or more with respect to the original length of the laminate. Such high stretching ratio can be achieved by adopting, for example, the underwater stretching mode (in-boric-acid-solution stretching). It should be noted that the term "maximum stretching ratio" as used in this specification refers to a stretching ratio immediately before the rupture of the laminate. The stretching ratio at which the laminate ruptures is separately identified and a value lower than the value by 0.2 is the maximum stretching ratio.

In one embodiment, the laminate is subjected to in-air stretching at high temperature (e.g., 95° C. or more), and then subjected to the in-boric-acid-solution stretching, and dyeing to be described later. Such in-air stretching is hereinafter referred to as "preliminary in-air stretching" because the stretching can be ranked as stretching preliminary or auxiliary to the in-boric-acid-solution stretching.

When the preliminary in-air stretching is combined with the in-boric-acid-solution stretching, the laminate can be stretched at an additionally high ratio in some cases. As a result, a polarizing film having additionally excellent optical characteristics (such as a polarization degree) can be produced. For example, when a polyethylene terephthalate-based resin is used as the resin substrate, the resin substrate can be stretched satisfactorily, while its orientation is suppressed, by a combination of the preliminary in-air stretching and the in-boric-acid-solution stretching than that in the case of the in-boric-acid-solution stretching alone. As the orientation property of the resin substrate is raised, its stretching tension increases and hence it becomes difficult to stably stretch the substrate or the resin substrate ruptures. Accordingly, the laminate can be stretched at an additionally high ratio by stretching the resin substrate while suppressing its orientation.

In addition, when the preliminary in-air stretching is combined with the in-boric-acid-solution stretching, the orientation property of the PVA-based resin is improved and hence the orientation property of the PVA-based resin can be improved even after the in-boric-acid-solution stretching. Specifically, the orientation property of the PVA-based resin is improved in advance by the preliminary in-air stretching so that the PVA-based resin may easily cross-link with boric acid during the in-boric-acid-solution stretching. Then, the stretching is performed in a state where boric acid serves as a junction, and hence the orientation property of the PVA-based resin is assumed to be high even after the in-boric-acid-solution stretching. As a result, a polarizing film having excellent optical characteristics (such as a polarization degree) can be produced.

The stretching ratio in the preliminary in-air stretching is preferably 3.5 times or less. A stretching temperature in the preliminary in-air stretching is preferably equal to or higher than the glass transition temperature of the PVA-based resin. The stretching temperature is preferably 95° C. to 150° C. It should be noted that the maximum stretching ratio when the preliminary in-air stretching and the in-boric-acid-solution stretching are combined with each other is preferably 5.0 times or more, more preferably 5.5 times or more, still more preferably 6.0 times or more with respect to the original length of the laminate.

A-3. Dyeing

The dyeing of the laminate is typically performed by causing the PVA-based resin layer to adsorb a dichromatic substance (preferably iodine). A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, a method involving immersing the laminate in the dyeing liquid is preferred. This is because iodine can satisfactorily adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide so that the solubility of iodine in water may be increased. Specific examples of the iodide are as described above. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. so that the dissolution of the PVA-based resin may be suppressed. When the PVA-based resin layer is immersed in the dyeing liquid, an immersion time is preferably 5 seconds to 5 minutes so that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

The dyeing treatment can be performed at any appropriate timing. When the underwater stretching is performed, the dyeing treatment is preferably performed before the underwater stretching.

A-4. Any other Treatment

The laminate may be appropriately subjected to a treatment for forming the PVA-based resin layer into a polarizing film in addition to the stretching and dyeing. Examples of the treatment for forming the PVA-based resin layer into the polarizing film include an insolubilizing treatment, a cross-linking treatment, a washing treatment, and a drying treatment. It should be noted that the number of times, order, and the like of these treatments are not particularly limited.

The insolubilizing treatment is typically performed by immersing the PVA-based resin layer in an aqueous solution of boric acid. Water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed before the underwater stretching treatment or the dyeing treatment.

The cross-linking treatment is typically performed by immersing the PVA-based resin layer in an aqueous solution of boric acid. Water resistance can be imparted to the PVA-based resin layer by subjecting the layer to the cross-linking treatment. The concentration of the aqueous solution of boric acid is preferably 1 part by weight to 5 parts by weight with respect to 100 parts by weight of water. In addition, when the cross-linking treatment is performed after the dyeing treatment, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 60° C. The cross-linking treatment is preferably performed before the underwater stretching treatment. In a preferred embodiment, the dyeing treatment, the cross-linking treatment, and the underwater stretching treatment are performed in the stated order.

The washing treatment is typically performed by immersing the PVA-based resin layer in an aqueous solution of potassium iodide. The drying temperature in the drying treatment is preferably 30° C. to 100° C.

A-5. Polarizing Film

The polarizing film is substantially a PVA-based resin layer that adsorbs and orients a dichromatic substance. The thickness of the polarizing film is typically 25 μm or less, preferably 15 μm or less, more preferably 10 μm or less, still more preferably 7 μm or less, particularly preferably 5 μm or less. Meanwhile, the thickness of the polarizing film is preferably 0.5 μm or more, more preferably 1.5 μm or more. The polarizing film preferably shows absorption dichroism at any wavelength in the wavelength range of 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

B. Step of Producing Optically Functional Film Laminate

After the laminate (PVA-based resin layer) has been subjected to the respective treatments, an optically functional film is laminated on the laminate on the polarizing film (PVA-based resin layer) side. An optically functional film having a long shape is typically laminated on the laminate having a long shape so that their lengthwise directions are aligned.

The optically functional film can function as, for example, a protective film for a polarizing film or a retardation film.

Any appropriate resin film may be adopted as the optically functional film. As a formation material for the optically functional film, there are given, for example: a cellulose-based resin such as triacetyl cellulose (TAC); a cycloolefin-based resin such as a norbornene-based resin; an olefin-based resin such as polyethylene or polypropylene; a polyester-based resin; and a (meth)acrylic resin. It should be noted that the term "(meth)acrylic resin" refers to an acrylic resin and/or a methacrylic resin.

The thickness of the optically functional film is typically 10 μm to 100 μm, preferably 20 μm to 60 μm. It should be noted that the optically functional film may be subjected to various surface treatments.

Figure 2:
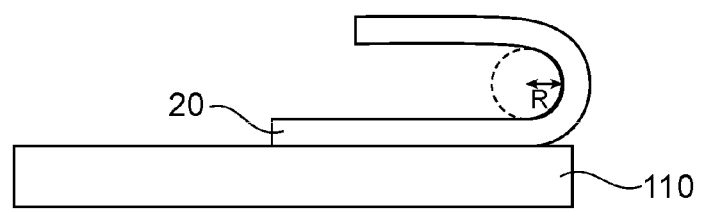
FIG. 2 is an explanatory diagram of a method of measuring a radius of curvature R.

The modulus of elasticity of the optically functional film is preferably 2 GPa or more, more preferably 2 GPa to 6 GPa. When one end portion of an optically functional film 20 is held in a state where the other end portion thereof is bonded to a substrate 110, and is then bent in a 180° direction with respect to the bonding surface as illustrated in FIG. 2, a radius of curvature R of the bent portion is preferably 3 mm or more, more preferably 5 mm or more. A peeling step to be described later can be performed more satisfactorily by using such optically functional film.

The lamination of the optically functional film is performed using any appropriate adhesive or pressure-sensitive adhesive. In one embodiment, the adhesive is applied onto the surface of the polarizing film before the optically functional film is attached. The adhesive may be an aqueous adhesive, or may be a solvent-based adhesive. Of those, an aqueous adhesive is preferably used.

Any appropriate aqueous adhesive may be adopted as the aqueous adhesive. An aqueous adhesive containing a PVA-based resin is preferably used. The average polymerization degree of the PVA-based resin in the aqueous adhesive is preferably about 100 to 5,000, more preferably 1,000 to 4,000 in terms of adhesion. Its average saponification degree is preferably about 85 mol % to 100 mol %, more preferably 90 mol % to 100 mol % in terms of adhesion.

The PVA-based resin in the aqueous adhesive preferably contains an acetoacetyl group. This is because such resin can be excellent in adhesiveness between the PVA-based resin layer and the optically functional film, and in durability. The acetoacetyl group-containing PVA-based resin is obtained by, for example, causing a PVA-based resin and diketene to react with each other by any appropriate method. The acetoacetyl group modification degree of the acetoacetyl group-containing PVA-based resin is typically 0.1 mol % or more, preferably about 0.1 mol % to 40 mol %, more preferably 1 mol % to 20 mol %, particularly preferably 2 mol % to 7 mol %. It should be noted that the acetoacetyl group modification degree is a value measured by NMR.

The resin concentration of the aqueous adhesive is preferably 0.1 wt % to 15 wt %, more preferably 0.5 wt % to 10 wt %.

The thickness of the adhesive at the time of the application can be set to any appropriate value. For example, the thickness is set so that an adhesive layer having a desired thickness may be obtained after heating (drying). The thickness of the adhesive layer is preferably 10 nm to 300 nm, more preferably 10 nm to 200 nm, particularly preferably 20 nm to 150 nm.

Heating is preferably performed after lamination of the optically functional film. A temperature for the heating is preferably 50° C. or more, more preferably 55° C. or more, still more preferably 60° C. or more, particularly preferably 80° C. or more. It should be noted that the heating performed after lamination of the optically functional film may also serve as the drying treatment of the laminate. In addition, the heating may be performed before or after a peeling step to be described later, and is preferably performed before the peeling step.

C. Peeling Step

The resin substrate is peeled from the optically functional film laminate. At that time, the peeling is performed so that an angle α formed between the surface of the optically functional film laminate immediately before the peeling and the peeling direction of the resin substrate may be smaller than an angle β formed between the surface of the optically functional film laminate immediately before the peeling and the peeling direction of the polarizing film. According to such embodiment, the resin substrate can be satisfactorily peeled while the occurrence of a wrinkle, foreign matter (such as a substrate residue), or the like is suppressed. As a result, a polarizing plate extremely excellent in external appearance can be obtained. In addition, a tension needed for the peeling can be reduced and hence a load on facilities can be alleviated.

A difference between the angle β and the angle α is preferably 60° or more, more preferably 90° to 180°. The angle α is preferably 30° or less, more preferably 0° to 20°. The angle β is preferably 60° or more, more preferably 90° to 180°.

A tension (peel tension) needed for the peeling is preferably 3.0 N/15 mm or less, more preferably 1.0 N/15 mm or less, particularly preferably 0.5 N/15 mm or less.

Figure 3:
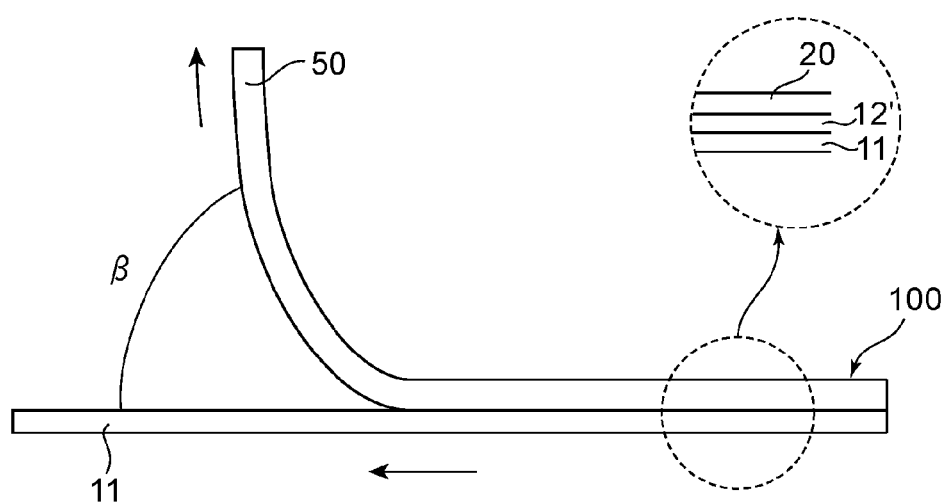
FIG. 3 is a schematic view illustrating an example of a peeling step in the present invention.

FIG. 3 is a schematic view illustrating an example of the peeling step. An optically functional film laminate 100 has the resin substrate 11, a polarizing film 12', and the optically functional film 20 in the stated order. In the illustrated example, the resin substrate 11 is peeled from the optically functional film laminate 100 by pulling, while conveying the optically functional film laminate 100 in a substantially horizontal direction, a laminate (polarizing plate) 50 of the polarizing film 12' and the optically functional film 20 upward with respect to the conveyance surface of the optically functional film laminate 100. At the time of the peeling, the peeling direction of the resin substrate 11 is substantially the same as the conveyance direction of the optically functional film laminate 100 immediately before the peeling, and the peeling direction of the polarizing film 12' is the pulling direction. Therefore, in the illustrated example, the angle α is substantially 0°.

Figure 4:
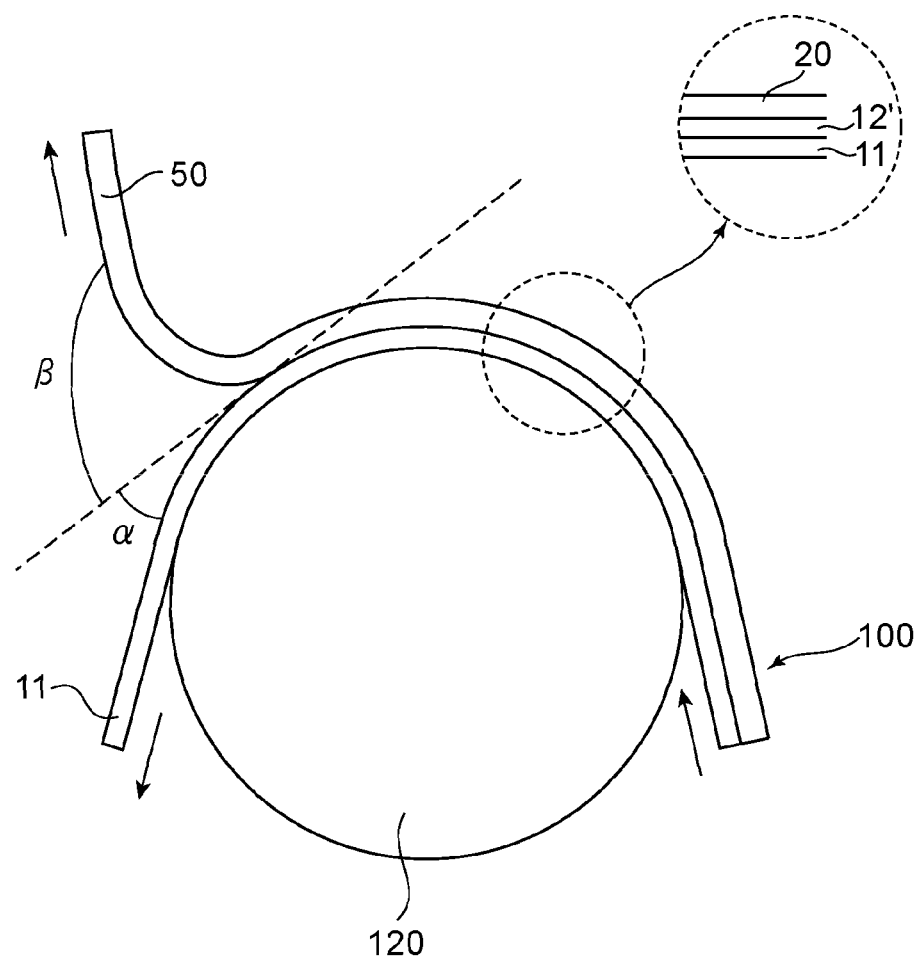
FIG. 4 is a schematic view illustrating another example of the peeling step in the present invention.

FIG. 4 is a schematic view illustrating another example of the peeling step. In this illustrated example, the resin substrate 11 is peeled from the optically functional film laminate 100 by pulling, while conveying the optically functional film laminate 100 so that its resin substrate 11 side may be brought into contact with a roll 120, the laminate (polarizing plate) 50 of the polarizing film 12' and the optically functional film 20 in a direction going away from the roll 120 with respect to the conveyance surface of the optically functional film laminate 100. In this example, the surface of the optically functional film laminate immediately before the peeling is a surface including a tangent at the point at which the polarizing film 12' goes away. At the time of the peeling, the peeling direction of the resin substrate 11 is substantially the same as the conveyance direction of the optically functional film laminate 100 immediately before the peeling, and the peeling direction of the polarizing film 12' is the pulling direction. Therefore, in the illustrated example, such angle α as illustrated in FIG. 4 is specified and the angle α is smaller than the angle β.

The modulus of elasticity of the resin substrate at the time of the peeling is typically 2 GPa to 3 GPa. The modulus of elasticity of the resin substrate before the stretching is typically 2 GPa to 3 GPa. The modulus of elasticity of the laminate (polarizing plate) of the polarizing film and the optically functional film is preferably 4 GPa to 7 GPa. In addition, the radius of curvature R of the resin substrate (at the time of the peeling) is typically 1 mm to 10 mm. The radius of curvature R of the laminate (polarizing plate) of the polarizing film and the optically functional film is preferably 3 mm to 30 mm. When the PVA-based resin layer is subjected to a treatment such as stretching or cross-linking, the rigidity of the polarizing film to be obtained is high and hence the film can sufficiently resist such peeling as described above.

Figure 5A:
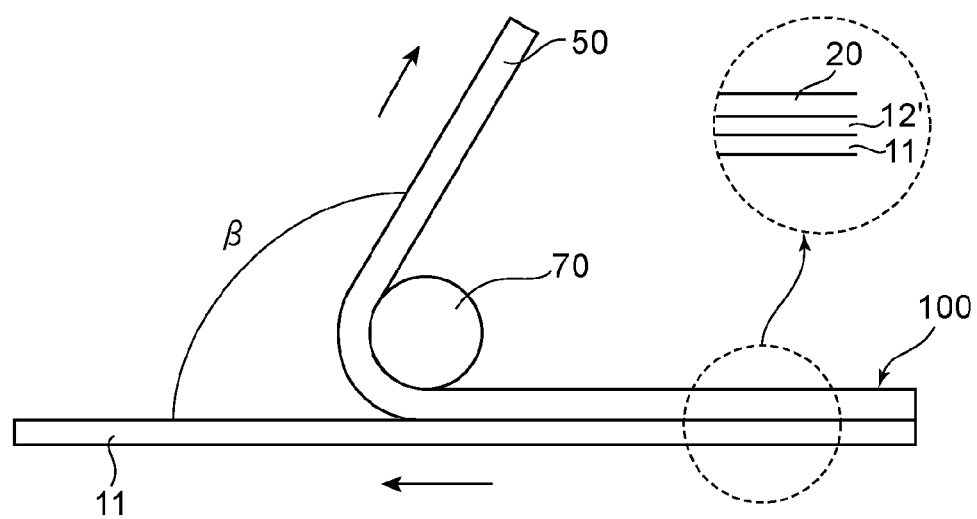
FIG. 5A is a schematic view illustrating still another example of the peeling step in the present invention.
Figure 5B:
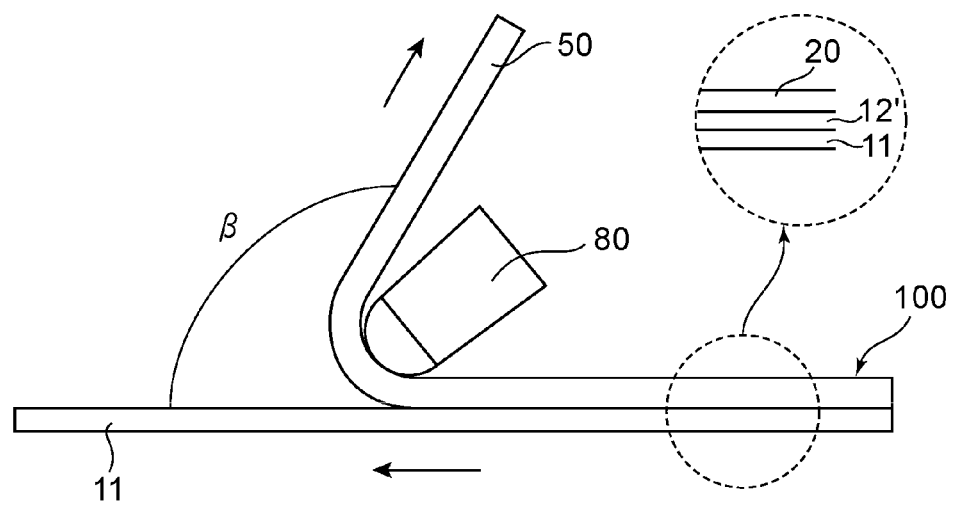
FIG. 5B is a schematic view illustrating still another example of the peeling step in the present invention.

In the peeling step, peeling auxiliary means may be placed on the optically functional film laminate 100 on the optically functional film 20 side so that the peeling may be performed more easily, more satisfactorily, and more stably. Examples of the peeling auxiliary means include such peeling roll 70 as illustrated in FIG. 5A and such peeling bar 80 as illustrated in FIG. 5B. The peeling roll 70 is brought into abutment with the optically functional film laminate 100 on the optically functional film 20 side and the roll itself aids the peeling while rotating. When the peeling roll is used, a roll diameter is preferably 5 mm to 80 mm, more preferably 5 mm to 50 mm, still more preferably 10 mm to 30 mm. When the roll diameter is excessively large, a peel strength becomes large and hence good peeling cannot be performed in some cases. When the roll diameter is excessively small, the strength of the roll becomes insufficient and hence peeling stability becomes insufficient in some cases. When the peeling bar 80 is used, the peeling bar typically has a tip portion whose section is of a semicircular shape, the tip portion is brought into abutment with the optically functional film laminate 100 on the optically functional film 20 side, and the bar aids the peeling without rotating. When the peeling bar is used, the diameter of the tip portion is preferably 5 mm to 80 mm, more preferably 5 mm to 50 mm, still more preferably 5 mm to 30 mm. At this time, a surface protective film may be laminated on a surface of the optically functional film laminate on the optically functional film side for preventing the occurrence of a flaw due to the peeling roll or the peeling bar. Although the surface protective film is not particularly limited, the surface protective film is typically, for example, a polyethylene-based film having a pressure-sensitive adhesive layer provided on its surface, and the film can be attached to the surface of the optically functional film with the pressure-sensitive adhesive layer.

EXAMPLES

Hereinafter, the present invention is specifically described byway of Examples. However, the present invention is not limited to Examples shown below. It should be noted that methods of measuring the respective characteristics are as described below.

1. Thickness

Measurement was performed with a digital micrometer (manufactured by ANRITSU CORPORATION, product name: "KC-351C").

2. Glass Transition Temperature (Tg)

Measurement was performed in conformity with JIS K 7121.

3. Modulus of Elasticity

A sample was formed into a tensile test dumbbell whose parallel portion had a width of 10 mm and a length of 40 mm on the basis of JIS K6734:2000, and then its modulus of elasticity in tension was determined by performing a tensile test in conformity with JIS K7161:1994.

4. Radius of Curvature R

As illustrated in FIG. 2, one end portion in the lengthwise direction of a test piece having a width of 50 mm was held in a state where the other end portion thereof was bonded to a substrate, and was then bent by being pulled in a 180° direction with respect to the bonding surface with a force of 150 gw. A radius of curvature was determined by measuring the radius of the bent portion at that time. It should be noted that the test piece was cut out so that its lengthwise direction corresponded to a peeling direction.

5. Peel Tension

One end portion in the lengthwise direction of a test piece (optically functional film laminate) having a width of 15 mm and a length of 100 mm was peeled in advance, and then the peeled portion was held and peeled in a specified angle direction at a rate of 3 m/min. A peel tension was determined by measuring a tension at the time of the peeling.

Example 1-1

An amorphous polyethylene terephthalate (A-PET) film (manufactured by Mitsubishi Chemical Corporation, trade name: "NOVACLEAR," thickness: 100 μm) having a long shape and having a percentage of water absorption of 0.60%, a Tg of 80° C., and a modulus of elasticity of 2.5 GPa was used as a resin substrate.

One surface of the resin substrate was subjected to a corona treatment (treatment condition: 55 W·mim/m²), and an aqueous solution containing 90 parts by weight of polyvinyl alcohol (polymerization degree: 4,200, saponification degree: 99.2 mol %) and 10 parts by weight of acetoacetyl-modified PVA (polymerization degree: 1,200, acetoacetyl modification degree: 4.6%, saponification degree: 99.0 mol % or more, manufactured by The Nippon Synthetic Chemical Industry Co., Ltd., trade name: "GOHSEFIMER Z200") was applied onto the surface subjected to the corona treatment, and was then dried at 60° C. so that a PVA-based resin layer having a thickness of 10 μm was formed, thereby producing a laminate.

The resultant laminate was subjected to free-end uniaxial stretching in its longitudinal direction (lengthwise direction) at 1.8 times in an oven at 120° C. between rolls having different peripheral speeds (preliminary in-air stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. (an aqueous solution of iodine obtained by compounding 100 parts by weight of water with 0.2 part by weight of iodine and 1.0 part by weight of potassium iodide) for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, the laminate was uniaxially stretched in its longitudinal direction (lengthwise direction) between rolls having different peripheral speeds while being immersed in an aqueous solution of boric acid having a liquid temperature of 70° C. (an aqueous solution obtained by compounding 100 parts by weight of water with 4 parts by weight of boric acid and 5 parts by weight of potassium iodide) (underwater stretching). In this case, the laminate was stretched immediately before its rupture (the maximum stretching ratio was 6.0 times).

After that, the laminate was immersed in a washing bath having a liquid temperature of 30° C. (an aqueous solution obtained by compounding 100 parts by weight of water with 4 parts by weight of potassium iodide) (washing treatment).

Subsequently, an aqueous solution of a PVA-based resin (manufactured by The Nippon Synthetic Chemical Industry Co., Ltd., trade name: "GOHSEFIMER (trademark) Z-200," resin concentration: 3 wt %) was applied onto the surface of the PVA-based resin layer of the laminate. A triacetyl cellulose film having a modulus of elasticity of 4.0 GPa (manufactured by Konica Minolta, Inc., trade name: "KC4UY," thickness: 40 μm) was attached to the resultant, and the whole was heated in an oven maintained at 60° C. for 5 minutes, thereby producing an optically functional film laminate having a polarizing film with a thickness of 5 μm.

The resultant optically functional film laminate was mounted on a flat table so that its resin substrate was on a lower side, and then peeling was performed in a state where end portions of the PVA-based resin layer (polarizing film) and the triacetyl cellulose film were held at 90° with respect to the flat table (peel angle β: 90°). Thus, a polarizing plate was obtained.

The polarizing plate had a modulus of elasticity of 6.0 GPa and a radius of curvature R of 5 mm, and the peeled resin substrate had a modulus of elasticity of 2.5 GPa and a radius of curvature R of 2 mm.

Example 1-2

A polarizing plate was obtained in the same manner as in Example 1-1 except that the peel angle β was changed to 150°.

Example 1-3

A polarizing plate was obtained in the same manner as in Example 1-1 except that: a polyethylene-based surface protective film (manufactured by Sun A. Kaken Co., Ltd., PAC-3, thickness: 30 μm) was attached to a surface of the optically functional film laminate on the triacetyl cellulose film side, and such peeling roll (roll diameter: 20 mm) as illustrated in FIG. 5A was brought into abutment with the film; and the peel angle β was changed to 120°. Continuous peeling of the roll-shaped optically functional film laminate was able to be performed more stably by using the peeling roll.

Example 1-4

A polarizing plate was obtained in the same manner as in Example 1-1 except that: a polyethylene-based surface protective film (manufactured by Sun A. Kaken Co., Ltd., PAC-3, thickness: 30 μm) was attached to a surface of the optically functional film laminate on the triacetyl cellulose film side, and such peeling bar (diameter of tip portion: 5 mm) as illustrated in FIG. 5B was brought into abutment with the film; and the peel angle β was changed to 120°. Continuous peeling of the roll-shaped optically functional film laminate was able to be performed more stably by using the peeling bar in the same manner as in Example 1-3.

Comparative Example 1-1

An optically functional film laminate obtained in the same manner as in Example 1-1 was mounted on a flat table so that its triacetyl cellulose film was on a lower side, and then peeling was attempted in a state where an end portion of the resin substrate was held at 90° with respect to the flat table (peel angle α: 90°).

Comparative Example 1-2

Peeling was attempted in the same manner as in Comparative Example 1-1 except that the peel angle α was changed to 150°.

Example 2

A norbornene-based resin film (manufactured by JSR Corporation, trade name: "ARTON," thickness: 150 μm) having a long shape, a Tg of 130° C., and a modulus of elasticity of 2 GPa was used as a resin substrate.

An aqueous solution of a polyvinyl alcohol (PVA) resin (manufactured by The Nippon Synthetic Chemical Industry Co., Ltd., trade name: "GOHSENOL (registered trademark) NH-26") having a polymerization degree of 2,600 and a saponification degree of 99.0 mol % was applied onto one surface of the resin substrate, and was then dried at 80° C. so that a PVA-based resin layer having a thickness of 7 μm was formed, thereby producing a laminate.

The resultant laminate was stretched in its widthwise direction at a stretching ratio of up to 4.5 times under heating at 140° C. with a tenter apparatus by free-end uniaxial stretching. The thickness of the PVA-based resin layer after the stretching treatment was 3 μm (in-air stretching).

Next, the laminate was immersed in a dyeing bath having a liquid temperature of 30° C. (an aqueous solution of iodine obtained by compounding 100 parts by weight of water with 0.5 part by weight of iodine and 3.5 parts by weight of potassium iodide) for 60 seconds (dyeing treatment).

Next, the laminate was immersed in a cross-linking bath having a liquid temperature of 60° C. (an aqueous solution of boric acid obtained by compounding 100 parts by weight of water with 5 parts by weight of potassium iodide and 5 parts by weight of boric acid) for 60 seconds (cross-linking treatment).

After that, the laminate was immersed in a washing bath (an aqueous solution obtained by compounding 100 parts by weight of water with 3 parts by weight of potassium iodide), and was then dried with warm air at 60° C. (washing and drying treatments).

Subsequently, an aqueous solution of a PVA-based resin (manufactured by The Nippon Synthetic Chemical Industry Co., Ltd., trade name: "GOHSEFIMER (trademark) Z-200," resin concentration: 3 wt %) was applied onto the surface of the PVA-based resin layer of the laminate. A norbornene-based resin film having a modulus of elasticity of 2 GPa (manufactured by JSR Corporation, trade name: "ARTON," thickness: 35 μm) was attached to the resultant, and the whole was heated in an oven maintained at 80° C. for 5 minutes, thereby producing an optically functional film laminate having a polarizing film with a thickness of 3 μm.

The resultant optically functional film laminate was mounted on a flat table so that its resin substrate was on a lower side, and then peeling was performed in a state where end portions of the PVA-based resin layer (polarizing film) and the norbornene-based resin film were held at 90° with respect to the flat table (peel angle β: 90°). Thus, a polarizing plate was obtained.

The polarizing plate had a modulus of elasticity of 5.0 GPa and a radius of curvature R of 5 mm, and the peeled resin substrate had a modulus of elasticity of 2.5 GPa and a radius of curvature R of 2 mm.

Comparative Example 2

An optically functional film laminate obtained in the same manner as in Example 2 was mounted on a flat table so that its norbornene-based resin film was on a lower side, and then peeling was attempted in a state where an end portion of the resin substrate was held at 90° with respect to the flat table (peel angle α: 90°).

The polarizing plates obtained in Examples and Comparative Examples were evaluated for their external appearances by visual observation. Table 1 shows the results of the evaluation together with the results of the measurement of their peel tensions. It should be noted that evaluation criteria for the external appearances are as described below.

(Evaluation Criteria for External Appearance)

Good: The resin substrate was able to be continuously peeled in a lengthwise direction, and neither a wrinkle nor foreign matter (such as a substrate residue) was observed in the resultant polarizing plate.

Bad: It was difficult to continuously peeling the resin substrate, and a wrinkle or foreign matter occurred in the resultant polarizing plate.

TABLE 1

| | Stretching mode | Peel angle | External appearance | Peel tension (N/15 mm) | Peeling auxiliary |
|---|---|---|---|---|---|
| Example 1-1 | Underwater | β: 90° | Good | 0.2 | — |
| Example 1-2 | Underwater | β: 150° | Good | 0.2 | — |
| Example 1-3 | Underwater | β: 120° | Good | 0.2 | Peeling roll |
| Example 1-4 | Underwater | β: 120° | Good | 0.2 | Peeling bar |
| Comparative Example 1-1 | Underwater | α: 90° | Bad | 9.0 | — |
| Comparative Example 1-2 | Underwater | α: 150° | Bad | 12.0 | — |
| Example 2 | In-air | β: 90° | Good | 0.2 | — |
| Comparative Example 2 | In-air | α: 90° | Bad | 9.0 | — |

The polarizing plate of the present invention is suitably used for liquid crystal panels of, for example, liquid crystal televisions, liquid crystal displays, cellular phones, digital cameras, video cameras, portable game machines, car navigation systems, copying machines, printers, facsimile machines, clocks, and microwave ovens. The polarizing film of the present invention is also suitably used as an antireflection film for an organic EL device.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of manufacturing a polarizing plate, comprising:
   forming a laminate comprising a resin substrate and a polyvinyl alcohol-based resin layer formed on one side of the resin substrate, then
   stretching and dyeing the laminate to produce a polarizing film on the resin substrate;
   laminating an optically functional film on the polarizing film on the resin substrate to produce an optically functional film laminate; and then
   peeling the resin substrate from the optically functional film laminate,
   wherein the peeling is performed so that an angle a is smaller than an angle $\beta$;
   wherein the angle $\alpha$ is formed between a surface of the optically functional film laminate immediately before the peeling and a peeling direction of the resin substrate, and
   wherein the angle $\beta$ is formed between the surface of the optically functional film laminate immediately before the peeling and a peeling direction of the polarizing film,
   wherein the surface of the optically functional film laminate is the surface directly facing the resin substrate; and
   wherein the peeling direction of the resin substrate is substantially the same as the conveyance direction of the optically functional film laminate immediately before the peeling and the peeling direction of the polarizing film is the pulling direction.

2. The method of manufacturing the polarizing plate according to claim 1, wherein a difference between the angle $\alpha$ and the angle $\beta$ is 60° or more.

3. The method of manufacturing the polarizing plate according to claim 2, wherein the difference between the angle $\alpha$ and the angle $\beta$ is 90° to 180°.

4. The method of manufacturing the polarizing plate according to claim 1, wherein a tension needed for the peeling is 3.0 N/15mm or less.

5. The method of manufacturing the polarizing plate according to claim 1, wherein the resin substrate has a modulus of elasticity at a time of the peeling of 2 GPa to 3 GPa.

6. The method of manufacturing the polarizing plate according to claim 1, wherein the resin substrate has a radius of curvature at a time of the peeling of 1 mm to 10 mm.

7. The method of manufacturing the polarizing plate according to claim 1, wherein, in the peeling, a peeling roll is arranged on the optically functional film laminate on an optically functional film side, and the peeling is performed with an aid of the peeling roll.

8. The method of manufacturing the polarizing plate according to claim 7, wherein the peeling roll has a diameter of 10 mm to 30 mm.

9. The method of manufacturing the polarizing plate according to claim 1, wherein, in the peeling, a peeling bar is arranged on the optically functional film laminate on an optically functional film side, and the peeling is performed with an aid of the peeling bar.

10. The method of manufacturing the polarizing plate according to claim 9, wherein the peeling bar has a diameter of a tip portion of 5 mm to 30 mm.

11. The method of manufacturing the polarizing plate according to claim 7, wherein a surface of the optically functional film laminate on the optically functional film side has a surface protective film attached thereto.

12. The method of manufacturing the polarizing plate according to claim 9, wherein a surface of the optically functional film laminate on the optically functional film side has a surface protective film attached thereto.

13. The method of manufacturing the polarizing plate according to claim 1, wherein:
   a difference between the angle $\alpha$ and the angle $\beta$ is 60° or more;
   a tension needed for the peeling is 3.0 N/15mm or less;
   the resin substrate has a modulus of elasticity at a time of the peeling of 2 GPa to 3 GPa; and
   the resin substrate has a radius of curvature at the time of the peeling of 1 mm to 10 mm.

14. The method of manufacturing the polarizing plate according to claim 7, wherein:
   a difference between the angle $\alpha$ and the angle 0 is 60° or more;
   a tension needed for the peeling is 3.0 N/15 mm or less;
   the resin substrate has a modulus of elasticity at a time of the peeling of 2 GPa to 3 GPa; and
   the resin substrate has a radius of curvature at the time of the peeling of 1 mm to 10 mm.

15. The method of manufacturing the polarizing plate according to claim 9, wherein:
   a difference between the angle $\alpha$ and the angle $\beta$ is 60° or more;
   a tension needed for the peeling is 3.0 N/15mm or less;
   the resin substrate has a modulus of elasticity at a time of the peeling of 2 GPa to 3 GPa; and
   the resin substrate has a radius of curvature at the time of the peeling of 1 mm to 10 mm.

16. A polarizing plate, which is obtained by the method of manufacturing the polarizing plate according to claim 1.

17. The method of manufacturing the polarizing plate according to claim 1, wherein the resin substrate is a noncrystalline polyethylene terephthalate-based resin.

18. The method of manufacturing the polarizing plate according to claim 1, wherein the stretching is performed in an underwater stretching mode.

19. The method of manufacturing the polarizing plate according to claim 1, wherein the underwater stretching mode is at a temperature lower than a glass transition temperature of the resin substrate and a glass transition temperature of the polyvinyl alcohol based resin layer.

20. The method of manufacturing the polarizing plate according to claim 1, wherein the laminate has a stretching ratio of 5.0 times or more.

21. The method of manufacturing the polarizing plate according to claim 1, wherein the optically functional film is a protective film.

22. The method of manufacturing the polarizing plate according to claim 1, wherein the optically functional film is a retardation film.

* * * * *

UNITED STATES PATENT AND TRADEMARK OFFICE
CERTIFICATE OF CORRECTION

| | |
|---|---|
| PATENT NO. | : 9,046,655 B2 |
| APPLICATION NO. | : 14/056178 |
| DATED | : June 2, 2015 |
| INVENTOR(S) | : Shusaku Goto et al. |

It is certified that error appears in the above-identified patent and that said Letters Patent is hereby corrected as shown below:

IN THE CLAIMS

Claim 1, Column 17, line 14

The line reading "wherein the peeling is performed so that an angle a is" should read as --wherein the peeling is performed so that an angle α is--.

Claim 14, Column 18, line 21

The line reading "a difference between the angle α and the angle 0 is 60° or" should read as --a difference between the angle α and the angle ß is 60° or--.

Signed and Sealed this
Eighth Day of December, 2015

Michelle K. Lee
*Director of the United States Patent and Trademark Office*